United States Patent [19]
Kubo

[11] Patent Number: 4,817,972
[45] Date of Patent: Apr. 4, 1989

[54] COLLET CHUCK

[75] Inventor: Haruaki Kubo, Osaka, Japan

[73] Assignee: Daishowa Seiki Co., Ltd., Osaka, Japan

[21] Appl. No.: 92,644

[22] Filed: Sep. 3, 1987

[30] Foreign Application Priority Data

Sep. 12, 1986 [JP] Japan ............................ 61-141079[U]
Oct. 7, 1986 [JP] Japan ............................ 61-154148[U]

[51] Int. Cl.$^4$ ............................................. B23B 31/04
[52] U.S. Cl. ........................................ 299/42; 279/48
[58] Field of Search ...................... 279/41 R, 42, 46 R, 279/52, 51, 48; 409/234

[56] References Cited

U.S. PATENT DOCUMENTS

| | | | |
|---|---|---|---|
| 2,346,706 | 4/1944 | Stoner | 279/46 |
| 3,451,686 | 6/1969 | Hammond | 279/51 |
| 3,652,100 | 3/1972 | Baturka | 279/51 |
| 3,726,532 | 4/1973 | Zeilinger | 279/52 |
| 3,810,641 | 5/1974 | Benjamin | 279/51 |
| 4,607,989 | 8/1986 | Kitamura | 409/234 |

FOREIGN PATENT DOCUMENTS

| | | | |
|---|---|---|---|
| 853849 | 8/1952 | Fed. Rep. of Germany | 279/51 |
| 900030 | 11/1953 | Fed. Rep. of Germany | 279/52 |
| 2337175 | 5/1974 | Fed. Rep. of Germany | 279/46 |
| 79932 | 4/1987 | Japan | 408/226 |
| 576834 | 6/1976 | Switzerland | 279/48 |

*Primary Examiner*—Gil Weidenfeld
*Assistant Examiner*—Daniel W. Howell
*Attorney, Agent, or Firm*—Koda and Androlia

[57] ABSTRACT

A collet chuck including a chuck body, a collet which is fitted into the chuck body thereof, a fastening nut for chucking a cutting tool which is screwed into the main body of the chuck when the fastening nut is attachably connected to the collet and the collet is adapted to be reduced in diameter and wherein an external flange is provided around the collet, a pair of internal flanges are provided on the fastening nut, and fitting of these flanges into one another permits the collet and the fastening nut to be detachably connected to one another while a pair of notched portions opposite each are formed on the inward flanges of the fastening nut so that mounting and detaching can be easily performed.

1 Claim, 4 Drawing Sheets

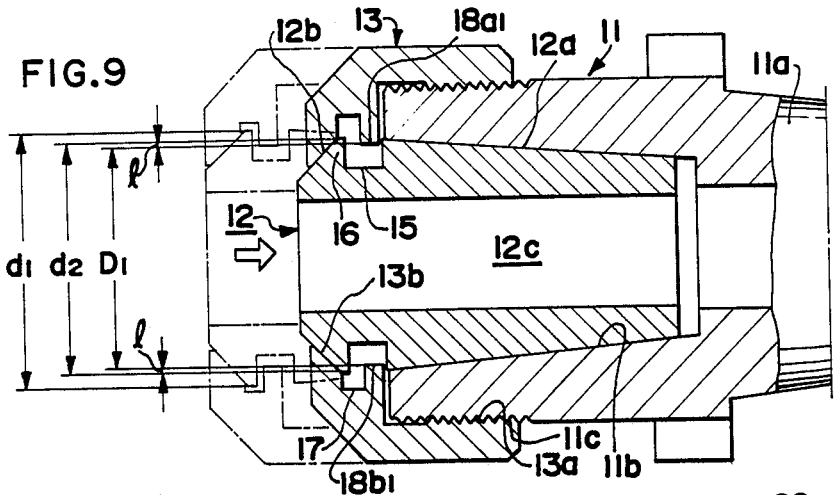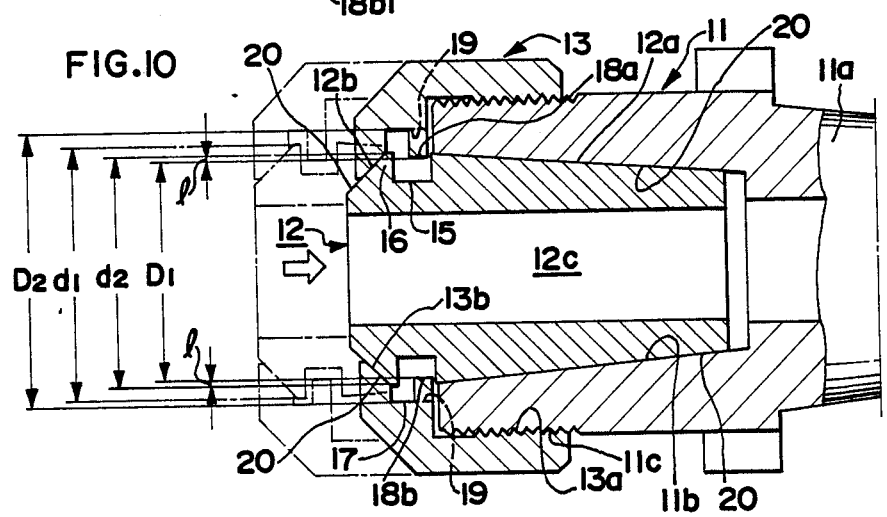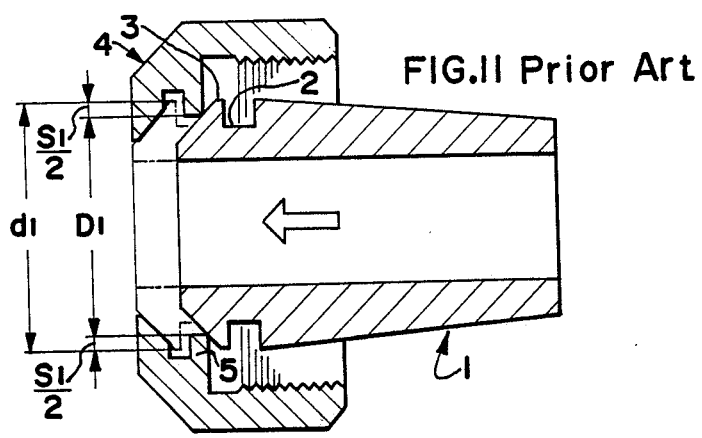

COLLET CHUCK

BACKGROUND OF THE INVENTION AND RELATED ART STATEMENT

1. Industrial application field

The present invention relates to a collet chuck for mounting a tool such as drill, end mill and the like to a rotary spindle in various kinds of machine tools.

2. Prior art

The collet chuck which has been conventionally used comprises a main body of a chuck having a tapered hole at its top end part, a collet having a tapered surface which is detachably fitted into the tapered hole at its external periphery, and a fastening nut which is fitted around the collet and, at the same time, is detachably screwed on the main body of the chuck, wherein the collet is adapted to be reduced in its diameter by axially elongated slots provided in the collet alternately from both the sides including its top end side and its rear end side, and a fastening operation of the fastening nut allows the collet not only to be fitted into the taper hole in a pressable manner but also to be reduced in its diameter, thereby fastening and fixing the tool which is fitted into the collet in an insertional manner. As the prior art of FIG. 11 shows, while an annular groove 2 is provided around the external periphery on the top end side of the collet 1 and an outward flange 3 is formed on the top end part of the collet 1, an inward flange 5 is formed around the internal periphery of the fastening nut 4, and, consequently, such a filling of the inward flange 5 into the annular groove 2 as shown by a dashed line of the same figure permits the collet 1 and the fastening nut 4 to be detachably connected to each other.

The collet 1 is fitted into the taper hole of the main body of the chuck and the pressing or drawing action of the fastening nut 4 causes the collet 1 to be mounted to or detached from the tapered hole.

Since the tool capable of being mounted by way of the collet into the main body of the chuck is limited to the one whose diameter of a shaft to be mounted therein is adequately adaptable to the possible scope of reducing the internal diameter of the collet by fastening the collet with the fastening nut, if there is a change between the tools to be mounted into the main body of the chuck, which have a remarkable difference in the diameter of their shafts to be mounted therein, there is a necessity of making a replacement with the collet whose internal diameter is equally corresponding to such a change. In that case, in order to mount or detach the collet 1 to or from the fastening nut 4, the prior art of FIG. 11 requires the collet 1 to be entirely reduced in its diameter at least to the extent of the difference in diameter S1 between the maximum external diameter d1 of the outward flange 3 and the internal diameter D1 of the inward flange 5. But, since the necessity of providing a margin to be held between both the flanges 3 & 5 even in the case where the diameter of the collet 1 is minimumized so that the collet 1 may be drawn out from the main body of the chuck, while the collet 1 is being accompanied with the fastening nut 4 in a pulling manner, the difference in diameter S1 is defined to a considerably long extent. The mounting or detaching of the collet 1 to or from the fastening nut 4 may need an extremely large amount force for the reduction of the diameter so that there is a difficulty in replacing only the collet in the process of the exchange between the tools.

SUMMARY OF THE INVENTION

Accordingly, the purpose of the present invention is to provide the collet chuck capable of mounting and detaching the collet to and from the fastening nut by a small force.

The further purpose of the present invention is to provide the collet chuck in which a high speed rotation of the spindle during the cutting work does not give rise to vibration of a cutting blade, an entire balance of its shape is kept, and a suitability for the precision machining substantially comes true.

The still further purpose of the present invention is to provide the collet chuck whose manufacturing is enabled to simplify the construction and is not costly with the afore-mentioned purposes attained.

BRIEF DESCRIPTION OF THE DRAWINGS

FIG. 9 is a longitudinal sectional view of the state of maximumizing the fastening force of the fastening nut under the same embodiment;

FIG. 10 is a longitudinal sectional view of the third embodiment according to the present invention; and FIG. 11 is a longitudinal sectional view of the collet chuck according to the prior art.

EMBODIMENTS OF THE INVENTION

Figure 1:
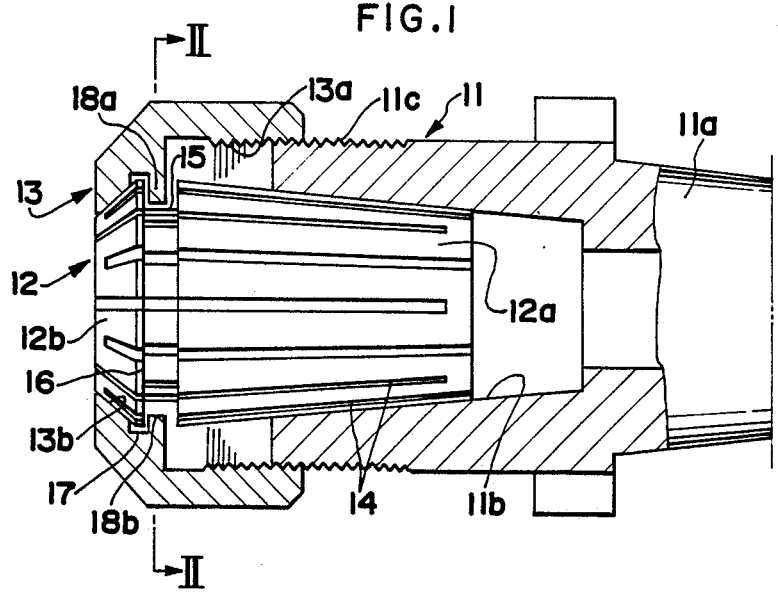
FIG. 1 is a longitudinal sectional view of the first embodiment according to the present invention wherein the fastening nut is in a state of being relaxed.

In FIGS. 1-7 illustrating the first embodiment of the present invention, 11 is the main body of the chuck having not only a tapered shank 11a at its rear end part but also the tapered hole 11b becoming tapering in proportion to an advance toward the rear area thereof at the inside of its top end side, 12 is the collet having the tapered surface 12a becoming tapering in proportion to the advance toward the rear area thereof around its external periphery, and 13 is the fastening nut which is detachably connected to the collet 12 and, at the same time, is detachably screwed on the main body of the chuck 11.

The collet 12, approximately cylindrical shaped, has a hole into which the tool is fitted 12c at its inside, the hole 12c being coaxial with a virtual central axis of the collet 12, the elongated slots 14, 14, & 14, . . . provided in the collet 12 are formed alternately from both the sides including its top end side and its rear end side with 8 lines of slots being made per the overall one group of directions. Providing of the annular groove 15 around the external periphery near to the top end side of the collet 12 has the outward flange 12 coaxial with the virtual central axis of the collet 12 formed at the top end side of the collet 12. A tapered surface 12b whose inclination takes a direction opposite to that of the tapered surface 12a is formed at the top end part of the collet 12.

Figure 2:
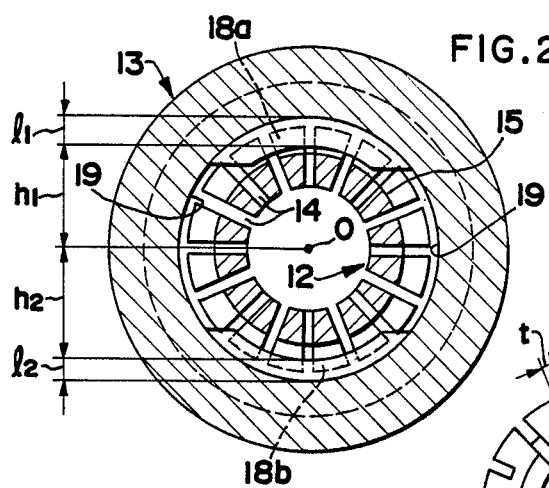
FIG. 2 is a sectional view taken on the line II—II of FIG. 1.
Figure 3:
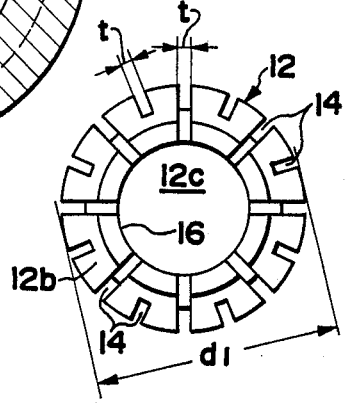
FIG. 3 is an end view taken from the top end side of the collet.
Figure 4A:
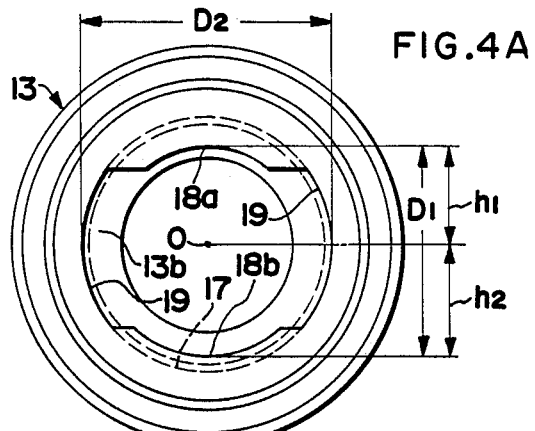
FIGS. 4A and 4B are end views taken from the base end side of the fastening nut.
Figure 4B:
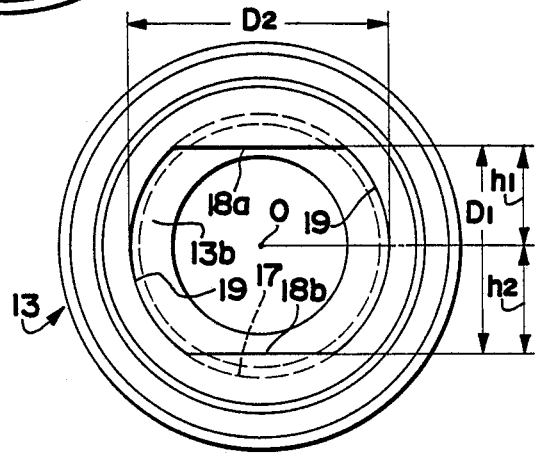

The fastening nut 13 has a female screw 13a threaded around its internal periphery near to the base end side so that the female screw 13a is screwed with a male screw 11c which is threaded around the external periphery near to the top end side of the main body of the chuck 11. The internal periphery near to the top end side of the fastening nut 13 is equipped with the tapered surface 13b whose angle of inclination is identical to that of the tapered surface 12b near to the top end side of the collet 12, the annular groove 17 coaxial with the virtual central axis of the nut 13 is formed around the position more internal than the tapered surface 13b, and a pair of inward flanges 18a and 18b are provided at the positions respectively opposite to each other in a radial direction and being adjoining to the annular groove 17. These inward flanges 18a and 18b are provided such that the internal diameter D1 between them (FIG. 5) is smaller than the external diameter d2 of the outward flange 16 (FIG. 5) which is established when the mounting of the collet 12 is made with its diameter being shrinked in a under-mentioned manner and, at the same time, distances from the axial center O to the inward flanges 18a and 18b are different from each other. As illustrated in FIG. 2, 4-A, 4-B, and 5, one of the distances is equal to h1 and another thereof is equal to h2, in other words, projecting amounts of both the flanges 18a and 18b are defined to l1 and l2 being different from each other as illustrated in FIG. 2. The internal peripheral sections 19 and 19 (notched portion) excluding both the flanges 18a and 18b of the nut 13 have the internal diameter D2 between them (FIGS. 4-A and 4-B) defined larger than the external diameter d1 of the outward flange 16 when the diameter of the collet 12 is increased (i.e. when the collet 12 is removed from the main body of the chuck 11.)

The collet 12 and the fastening nut 13 are connected to each other under the state where while the inward flanges 18a and 18b of the fastening nut 13 are fitted into the annular groove 15 of the collet 12, the outward flange 16 of the collet 12 is fitted into the annular groove 17 of the nut 13 at the same time. Subsequently, fitting the taper surface 12a of the collet 12, which is in such a connecting state, into the taper hole 11b of the main body of the chuck 11 and fastening of the fastening nut 13 onto the main body of the chuck 11 permit the collet 12 to be pressed at its tapered surface 12b on the top end side to face the taper face 13b of the nut 13, the collet 12 entering in a pressable manner into the taper hole 11b together with its diameter entirely reduced by the decrease of the width t of each of the slots. For this reason, when an execution of the afore-mentioned fastening operation follows the insertional fitting of the shaft to be mounted of the tool into the hole into which the tool is fitted in an insertional manner 12c of the collet 12, the reduction of the diameter of the hole into which the tool is fitted in an insertional manner 12c allows the tool to be fastened and fixed.

Figure 5:
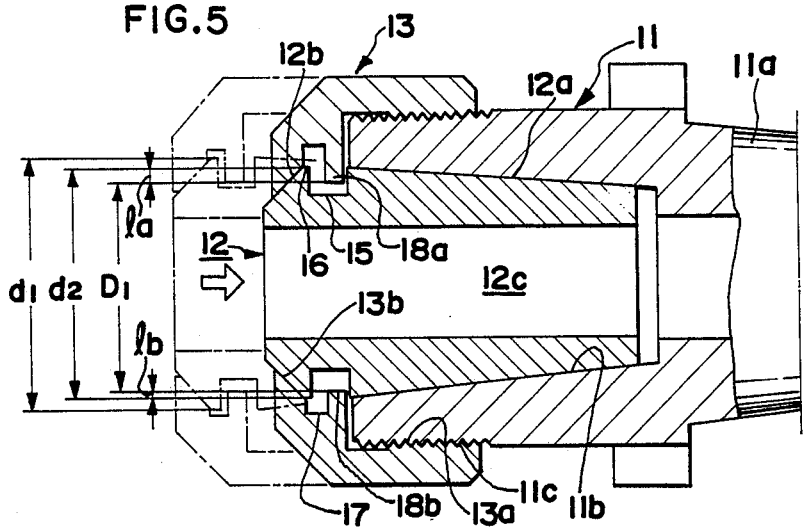
FIG. 5 is a longitudinal sectional view of the state of maximumizing the fastening force of the fastening nut.

The internal diameter D1 between a pair of inward flanges 18a and 18b being opposite to each other of the fastening nut 13 is defined smaller than such an external diameter of the outward flange 16 of the collet 12 under the state where the nut 13 is maximumly fastened as shown by a solid line of FIG. 5, i.e. the minimum external diameter d2. Relaxing of the nut 13 from the afore-mentioned maximum fastening state in which the corresponding dimensional relation, D1<d2, gives rise to la and lb of margins to be held between both the flanges 16, 18a, and 18b, followed by the axial movement of the collet 12, permits the collet 12 to be automatically pulled out from the taper hole 11b. The interval D2 between opposite internal peripheral sections excluding both the flanges 18a and 18b of the fastening nut 13, i.e. between the notched portions 19 and 19 is defined larger than such an external diameter, i.e. maximum external diameter d1 of the outward flange 16 of the collet 12 under the state prior to fastening of the nut 13 as shown by the dashed line of FIGS. 1 and 5. Namely, these dimensional relations are represented by D2>d1>d2>D1 and the resulting definition is that even when the outward flange 16 is at the minimum external diameter d2, the collet 12 does not reach its limiting smallest diameter with intervals left between the slots 14.

Figure 6:
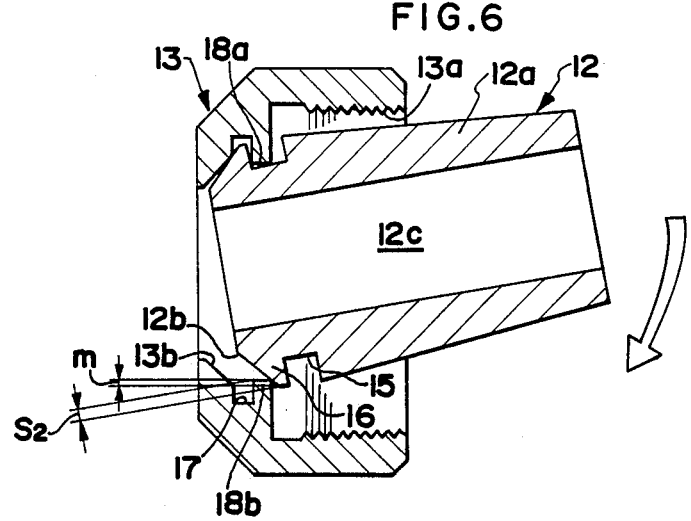
FIG. 6 is a longitudinal sectional view illustrating an operation of connecting the collet and the fastening nut to each other.
Figure 7:
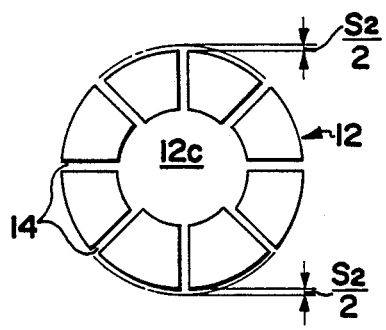
FIG. 7 is a typical sectional view illustrating a movement of the collet made at the afore-mentioned connecting operation.

In the collet chuck of the afore-mentioned construction, as shown in FIG. 6, mounting and detaching of collet 12 to and from the fastening nut 13 can be easily done by means of making the pertinent fitting in such a manner that the collet 12 is twisted from its position inclining from the virtual central axis into the nut 13. Namely, because of D2>d1, in order to make connection, a utilization of the space between the notched portions 19 and 19 may enable almost all the area of the outward flange 16 to be inserted into the side of the annular groove 17 of the fastening nut 13, while the collet 12 is taking a slightly inclining posture. Subsequently, upon holding the outward flange 16 in a fitting manner into one 18a of a pair of flanges 18a and 18b whose projecting amount is larger than that of another 18b, there takes place a surplus space the length of which is m between the latter inward flange 18b whose projecting amount is comparatively smaller and the outward flange 16, in response of which such a forward and backward rotation of the collet 12 as shown by arrow of the same figure may provide a simple operation of reducing the diameter of the collet 12 only to the extent of a convertible value S2 in a radial direction of the collet 12 equally as long as m with a possibility of housing fully the entire part of the outward flange 16 into the annular groove 17, thereby the connection is completed. In that case, the amount of reducing the diameter thereof S2 needs only to be extremely smaller in comparison with that of reducing the diameter thereof S1 necessary for making the pertinent connection under the construction of FIG. 11 as well as, as shown in FIG. 7, only 4 pieces in total consisting of two groups of two pieces opposite to each other in a radial direction among 8 pieces located at the top end side of the collet 12 have only to make a displacement simply by S2/2, so it is possible that the extremely small amount of force is only required for assuring the mounting and detaching to be easily made.

Figure 8:
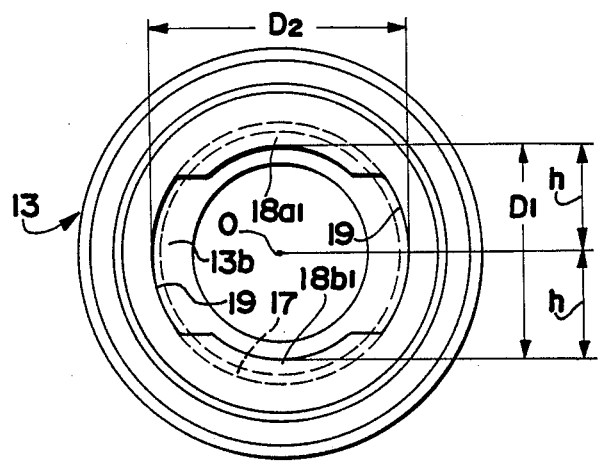
FIG. 8 is an end view, taken from the base end side of the fastening nut, of the second embodiment according to the present invention.

FIGS. 8 and 9 illustrate the second embodiment according to the present invention.

The second embodiment, similarly to the afore-mentioned embodiment, makes no different point in forming the dimentional relation represented by D2>d1 d1>d2>D1. For this reason, a description which puts a focus only on a different point between these two embodiments, omitting to cover the same constituent elements as those of the afore-mentioned embodiment with the same corresponding reference numbers applied thereto, may show that under the second embodiment, the projecting amounts of the inward flanges 18$a$1 and 18$b$1 of the fastening nut 13 are identical to each other, in other words, the distances h and h from the center of the axis O to each of the flanges 18$a$1 and 18$b$1 are identical to each other.

According to the second embodiment, as shown in FIG. 9, since the flanges 16, 18a1, and 18b1 are held with the margin to be held of the same width $l=(d2-D1)/2$ taking place, both the flanges 18$a$1 and 18$b$2 take positions symmetrical to each other with the center of the axis O as a center, and the projecting amounts (widths) of these flanges 18$a$1 and 18$b$1 are identical to each other, an occurrence of the vibration at the high speed rotation can be assuredly prevented.

Referring to FIG. 10, which illustrates the third embodiment according to the present invention, the structure of this embodiment is approximately identical to those of the afore-mentioned first and second embodiment.

Namely, the collet 12 and the fastening nut 13 are connected to each other under the state where while the inward flange 18 of the fastening nut 13 is fitted into the annular groove 15 of the collet 12 with the help of the notched portions 19 and 19, the outward flange 16 of the collet 12 is fitted into the annular groove 17 of the fastening nut 13 at the same time. Fitting of the tapered surface 12$a$ of the collet 12 being in such a connecting state into the taper hole 11$b$ of the main body of the chuck 11 and fastening of the fastening nut 13 onto the main body of the chuck 11 permit the collet 12 to be pressed at its taper face 12$b$ on the top end side to face the taper surface 13$b$ of the nut 13, the collet 12, reduced entirely its diameter, entering into the taper hole 11$b$ in a pressable manner, thereby the cutting tool is fastened and fixed in the hole into which the tool is inserted 12$c$. It is identical to the afore-mentioned first and second embodiment that the inward flanges 18$a$ and 18$b$ and the notched portions 19 and 19 of the fastening nut 13 and the outward flange 16 of the collet 12 show a relation represented by D2>d1>d2>D1.

The features of the third embodiment lie in a forming of ceramic film 20 on almost entire surface of the collet 12 including the tapered surface 12$b$ on the top end part, the bottom face and both the inner side faces of the annular recessed groove 15, the tapered surface 12$a$ which is fitted into the tapered hole 11$b$ of the main body of the chuck 11, and both the end faces of the collet as well as on the sections including the taper surface 13$b$ of the fastening nut 13, and the inner peripheral surface and both the side faces of the inward flanges 18$a$ and 18$b$. The ceramic film 20 comprises an extremely thin film of nitride such as TiN or TiC. In the case of preparing such a ceramic film, in general, a vaporing method in which the ceramic film is formed out of the vapor phase is used, the vaporing method including Chemical Vapor Deposition (CVD) depending on the chemical reaction and Physical Vapor Deposition (PVD) depending on the physical technique such as vaporisation and the like. In the present embodiment, the latter PVD, particularly a vacuum vaporisation, may be preferably employed in preparing the ceramic film 20. Furthermore, the ceramic film comprising the thin film of nitride such as TiN and the like is of ultrahardness, being of superiority in wear resistance and heat resistance.

The forming of the ceramic film on the surfaces of the collet and the fastening nut enables not only the wear resistance and the heat resistance of the collet chuck to be enhanced but also the nut to be smoothly rotated with a less frictional resistance between the taper faces 12$a$ and 13$b$ being directly rubbed.

I claim:

1. A collet chuck comprising a chuck body having an inwardly tapered hole in its top end side, a collet adapted to be reduced in its diameter having its external surface tapered so as to be detachably fitted into said tapered hole and a fastening nut which is detachably connected to said collet and, at the same time, is detachably screwed onto the chuck body for reducing the diameter of said collet while fitting the same into said tapered hole in a pressable manner, characterized in that said collet has its top end part equipped around its external periphery with an outward flange coaxial with a virtual central axis thereof, said fastening nut has its internal periphery equipped with a pair of opposed inward flanges coaxial with the virtual center axis thereof, a pair of notched portions are formed at positions opposite to each other in a radial direction of said inward flanges, the internal diameter between the inward flanges is smaller than a minimum external diameter of said outward flange when the diameter of the collet is reduced, both of said inward flanges are provided such that distances from the virtual central axis of the chuck body to inward end margins respectively of both of said inward flanges are different from each other, and a distance between said opposed pair of notched portions is larger than the maximum external diameter of said outward flange when the diameter of said collet is not reduced.

* * * * *